United States Patent
Watanabe et al.

(10) Patent No.: US 6,387,025 B1
(45) Date of Patent: May 14, 2002

(54) MACHINING DEVICE EQUIPPED WITH SPINDLE POSITION INTERCHANGER AND METHOD FOR INTERCHANGING SPINDLE POSITIONS

(75) Inventors: Akira Watanabe; Katsumi Kawagoe; Mitsuyuki Konishi, all of Kurita-gun; Isamu Takehana, Hiroshima, all of (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 0 days.

(21) Appl. No.: 09/437,234

(22) Filed: Nov. 10, 1999

(30) Foreign Application Priority Data

Feb. 12, 1999 (JP) .............................. 11-033897

(51) Int. Cl.⁷ .............................. B23Q 3/157; B23C 1/04
(52) U.S. Cl. .............................. 483/30; 29/40; 409/203; 409/213; 409/217; 483/1; 483/31
(58) Field of Search .............................. 483/1, 30, 31, 483/13, 54, 55, 56, 57; 29/40, 39, 27 C; 409/203, 213, 201, 202, 212, 217; 408/35

(56) References Cited

U.S. PATENT DOCUMENTS

| | | |
|---|---|---|
| 3,238,615 A | 3/1966 | Leone et al. |
| 3,259,976 A | 7/1966 | Bergstrom et al. |
| 3,570,369 A * | 3/1971 | Hoddinott, II et al. ..... 409/213 |
| 3,701,183 A * | 10/1972 | von Angerer et al. ...... 29/40 X |
| 3,846,904 A | 11/1974 | Kuhnert |
| 4,593,444 A * | 6/1986 | Kavthekar ................... 29/27 C |
| 4,597,144 A * | 7/1986 | Frank et al. ................. 409/217 |
| 4,602,901 A * | 7/1986 | Ramusino .................... 409/203 |
| 4,833,764 A * | 5/1989 | Müller ........................... 29/40 |
| 4,887,345 A | 12/1989 | Saito et al. |
| 5,486,151 A * | 1/1996 | Bergmann et al. ............. 483/1 |

FOREIGN PATENT DOCUMENTS

| | | | |
|---|---|---|---|
| DE | 3327084 | * 2/1985 | ..................... 483/1 |

(List continued on next page.)

OTHER PUBLICATIONS

Abstract of JP 01 159151 A (Nissan Motor Co. Ltd.), Pub. Date—Jun. 22, 1989 Patent Abstracts of Japan, vol. 013, No. 420, Sep. 19, 1989.

Abstract of JP 2000 042853 A (Mitsubishi Heavy Ind. Ltd), Pub. Date—Feb. 15, 2000 Patent Abstracts of Japan, vo. 2000, No. 05, Sep. 14, 2000.

*Primary Examiner*—William Briggs

(57) ABSTRACT

A machining device equipped with a spindle position interchanger comprises a longitudinal table provided on a bed and movable in a horizontal direction; a transverse table provided on the longitudinal table and movable in a direction perpendicular to the longitudinal table; a column erected on the transverse table and turnable in a horizontal plane; a first spindle head vertically movable along the column; a second spindle head provided at a position different from (at a position at 1800° to, or opposite to) the position of the first spindle head and vertically movable along the column independently of the first spindle head; a first main spindle and a second main spindle attached to the first spindle head and the second spindle head, respectively; a tool change arm for changing a tool in the second main spindle; and a tool magazine mounted on an upper portion of the column for housing many tools. This machining device, and a method for interchanging spindle positions in the machining device obviate the need for the time for tool change done while stopping the rotation of the main spindle.

2 Claims, 15 Drawing Sheets

FOREIGN PATENT DOCUMENTS

| | | | | |
|---|---|---|---|---|
| DE | 9015333 | 5/1991 | | |
| JP | 60249557 A | 12/1985 | | |
| JP | 61-219548 | * 9/1986 | ................... | 483/1 |
| JP | 1159151 | 6/1989 | | |
| JP | 3-136734 | * 6/1991 | ................... | 483/1 |
| JP | 4030933 A | 2/1992 | | |
| JP | 592337 | 4/1993 | | |
| JP | 5345209 A | 12/1993 | | |
| JP | 406091466 | * 4/1994 | ................... | 483/1 |
| WO | WO 9623613 | * 8/1996 | ................... | 483/1 |

* cited by examiner

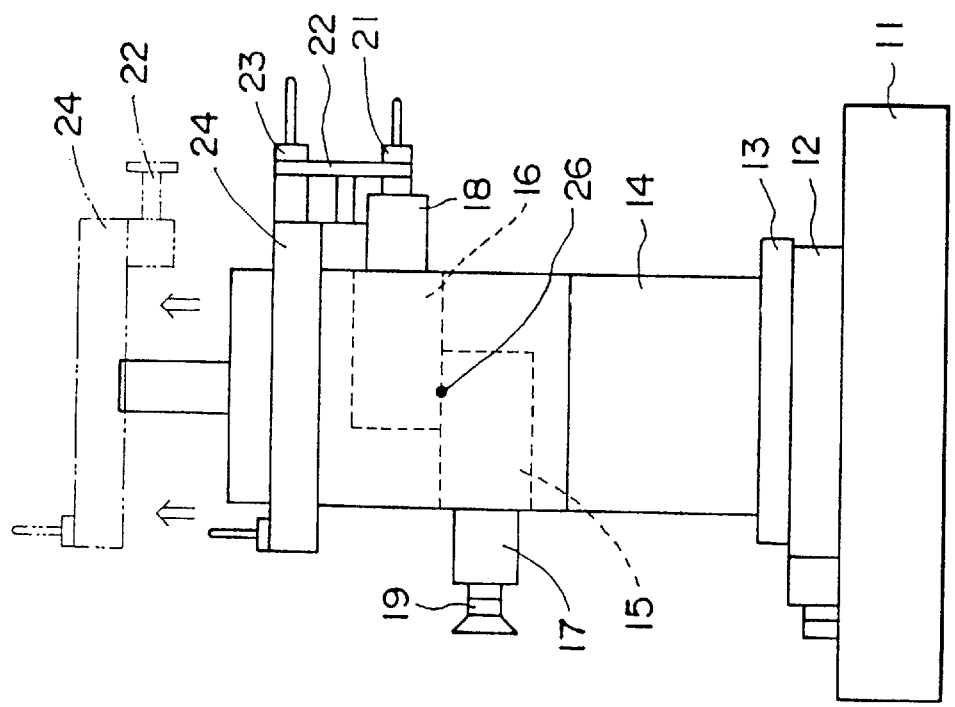

FIG. 16

MACHINING DEVICE EQUIPPED WITH SPINDLE POSITION INTERCHANGER AND METHOD FOR INTERCHANGING SPINDLE POSITIONS

BACKGROUND OF THE INVENTION

1. Field of the Invention

The present invention relates to a machining device equipped with a spindle position interchanger, and a method for interchanging spindle positions.

2. Description of the Related Art

The outline of an example of a conventional machining center is shown in FIGS. 8 and 9. As shown in FIGS. 8 and 9, this machining center comprises a longitudinal table 02 provided on a bed 01 and movable in a horizontal direction, a transverse table 03 provided on the longitudinal table 02 and movable in a direction perpendicular to the table 02, a column 04 erected on the transverse table 03, a spindle head 05 vertically movable along the column 04, a main spindle 06 attached to the spindle head 05, a tool change arm 08 for changing a tool 07 in the main spindle 06, and a tool magazine 010 housing many tools 09. In FIG. 9, the reference numeral 031 denotes a base plate for the bed, 032 denotes a ball screw and a support bearing, 033 denotes an X-axis slide cover, 034 denotes a Z-axis rear slide cover, 035 denotes a spindle and a motor, 036 denotes an ATC motor, 037 denotes a strut, and 038 denotes a control panel.

The above-described machining center has the main spindle 06, the tool change arm 08 adapted for the main spindle 06, andthemagazineolo storing the tools 09. Thus, this machining center can perform various types of machining one after another while changing the tool 07 in the main spindle 06 for a selected tool 09 in the tool magazine 010 by the use of the tool change arm 08. This tool change is carried out by moving the spindle head 05 to a predetermined tool change position, stopping rotation of the main spindle 06, gripping both of the tool 07 in the main spindle 06 and the tool 09 in the tool magazine 010 by the tool change arm 08, and turning the tool change arm 08. After completion of this tool change, the main spindle 06 is restarted. After a wait until the main spindle 06 reaches a predetermined revolution speed, a subsequent machining operation is performed.

In connection with the tool change, the following actions occur on the main spindle 06: ① Stoppage (deceleration) of the main spindle 06, ② change from the tool 07 in the main spindle 06 to the tool 09 selected from within the tool magazine 010, and ③ restart (acceleration) of the main spindle 06 after tool change. Periods of time required for these actions are added one to another sequentially.

How to reduce the times for the actions has been studied to ensure high efficiency and increased productivity on a machining line for mass production. However, the main spindle is present at one site only, so that the main spindle rotating at a high speed needs to be stopped. Thus, it has been difficult to shorten the time necessary for tool change. Particularly, as the frequency of tool change increases, this tool change time is accumulated, resulting in a decrease in productivity. To shorten the machining time, it is required to make the rotation of the main spindle as fast as possible. However, the time necessary for deceleration or acceleration is prolonged, failing to fulfill the requirement for reduction of the tool change time.

With a conventional machining device, therefore, a proposal has been made to provide two main spindles on a machining side, as shown in FIG. 10, and to move and control these main spindles individually. As illustrated in FIG. 10, this machining device has two spindle heads 025, 026 vertically movable along columns 023, 024 by respective feed motors 021, 022, and has main spindles 027, 028 installed on the spindle heads 025, 026. A tool magazine 029 is common to the main spindles 027, 028, and indexing and longitudinal movement of the tool magazine 029 result in the change of respective tools. A workpiece is mounted on a table 030.

Such a machining device has the two main spindles provided on the machining side in changing tools. Thus, the movement of the tools during tool change may induce interference with the workpiece, thereby limiting the timing of tool change. Furthermore, the spindle heads 025, 026 are present for the columns 023, 024, respectively, thus upsizing the entire machining device, and making the area of installation large. In addition, the distance between the two main spindles diminishes the effective moving distance to and from the workpiece.

SUMMARY OF THE INVENTION

The present invention has been accomplished to solve the foregoing problems with the earlier technologies.

According to a first aspect of the present invention, there is provided a machining device equipped with a spindle position interchanger, which has a spindle head vertically movably mounted on a moving column horizontally moving in longitudinal and transverse directions, the machining device comprising a turret unit provided on the spindle head rotatably about a turning axis; a plurality of main spindles provided on the turret unit, positions of the main spindles being interchangeable by rotation about the turning axis; spindle drive motors coupled to the respective main spindles; and a tool changer for performing tool change for the main spindle located at anon-machining position. Thus, even during indexing for spindle position interchange, the tool in the main spindle can keep rotating. Hence, during machining using a certain main spindle, the tool in another main spindle can be rotated beforehand, and can be put into machining immediately after indexing for the main spindle. Consequently, the non-cutting time can be decreased, the cycle time for machining can be shortened, so that productivity per machining device is increased. Using the same number of the machining devices of the present invention as the number of the conventional machining devices will make increased production possible. On condition that the same amount of work is to be machined, the use of the machining device of the present invention can decrease the required number of the machining devices.

According to a second aspect of the present invention, there is provided a method for interchanging spindle positions in a machining device equipped with a spindle position interchanger, the machining device having two or more main spindles connected to spindle drive motors, and the machining device including the spindle position interchanger for interchanging positions of the two or more main spindles by rotation about a turning axis, and a tool changer for changing a tool for at least one of the main spindles, the method comprising performing machining with the use of one of the main spindles, while changing a tool mounted on a different one of the main spindles; then starting rotation of the different main spindle; and then interchanging positions of the one main spindle and the different main spindle by rotation about the turning axis. Furthermore, machining is immediately started by use of the tool in the different main spindle after spindle position interchange. Thus, the time for tool change done while stopping the rotation of the main spindle, as in the earlier technology, becomes unnecessary. Moreover, if the revolution speed of the main spindle having a tool, which will replace the tool in current use for machining, is raised to a predetermined revolution speed before spindle position interchange, machining can be immediately started after spindle position interchange, so that the non-machining time can be reduced markedly.

According to a third aspect of the present invention, there is provided a method for interchanging spindle positions in a machining device equipped with a spindle position interchanger as recited in the second aspect, wherein the one main spindle during machining is provided so as not to interfere with the different main spindle when the tool is changed. Thus, tool change can be performed on the side opposite to the side on which machining is carried out. There is no interference between a workpiece and actions associated with tool change, so that the timing of change is not restricted.

According to a fourth aspect of the present invention, there is provided a method for interchanging spindle positions in a machining device equipped with a spindle position interchanger as recited in the second or third aspect, wherein the spindle position interchanger interchanges the positions of the two or more main spindles by rotating the two or more main spindles about the turning axis which is vertical. Thus, it is easy to interchange the positions of the main spindles, a space for turning is narrow, and space saving can be ensured.

According to a fifth aspect of the present invention, there is provided a method for interchanging spindle positions in a machining device equipped with a spindle position interchanger as recited in the second or third aspect, wherein the spindle position interchanger changes the positions of the two or more main spindles by rotating the two or more main spindles about the turning axis which is horizontal. Thus, the positions of the main spindles are easy to interchange.

According to a sixth aspect of the present invention, there is provided a method for interchanging spindle positions in a machining device equipped with a spindle position interchanger as recited in the fourth or fifth aspect, wherein the main spindles are perpendicular to or parallel to the turning axis. Thus, it becomes easy to arrange the main spindles.

According to a seventh aspect of the present invention, there is provided a method for interchanging spindle positions in a machining device equipped with a spindle position interchanger as recited in the fourth or fifth aspect, wherein the main spindles make arbitrary angles to the turning axis. Thus, it becomes easy to arrange the main spindles.

According to an eighth aspect of the present invention, there is provided a machining device equipped with a spindle position interchanger, comprising a moving column horizontally movable in longitudinal and transverse directions on a bed; a spindle head vertically movably mounted on the moving column; a turret unit provided on the spindle head rotatably about a turning axis; a plurality of main spindles provided on the turret unit, positions of the main spindles being interchangeable between a machining position and a non-machining position by rotation about the turning axis, and the main spindles being arranged at positions twisted relative to the turning axis; spindle drive motors coupled to the respective main spindles; and an automatic tool changer having a tool change arm for performing tool change for the main spindle located at the non-machining position. According to this aspect, the distance between the main spindles is so small that the entire machining device is compact in size.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIG. 6 is a perspective view of a machining device according to a third embodiment of the present invention;

FIG. 7(A) is a view showing a sequence of actions of the present embodiment (a two-spindle device), while

FIG. 16 is a plan view of the machining device according to the sixth embodiment (a turning axis and main spindles are at positions twisted relative to each other)

PREFERRED EMBODIMENTS OF THE INVENTION

Preferred embodiments of the present invention claiming a machining device equipped with a spindle position interchanger, and a method for interchanging spindle positions will now be described in detail based on the accompanying drawings, but it should be understood that the invention is not restricted thereby.

First Embodiment

A machining device equipped with a spindle position interchanger according to a first embodiment of the present invention interchanges the positions of two main spindles by turning the main spindles around a vertical axis of turning.

Figure 1:
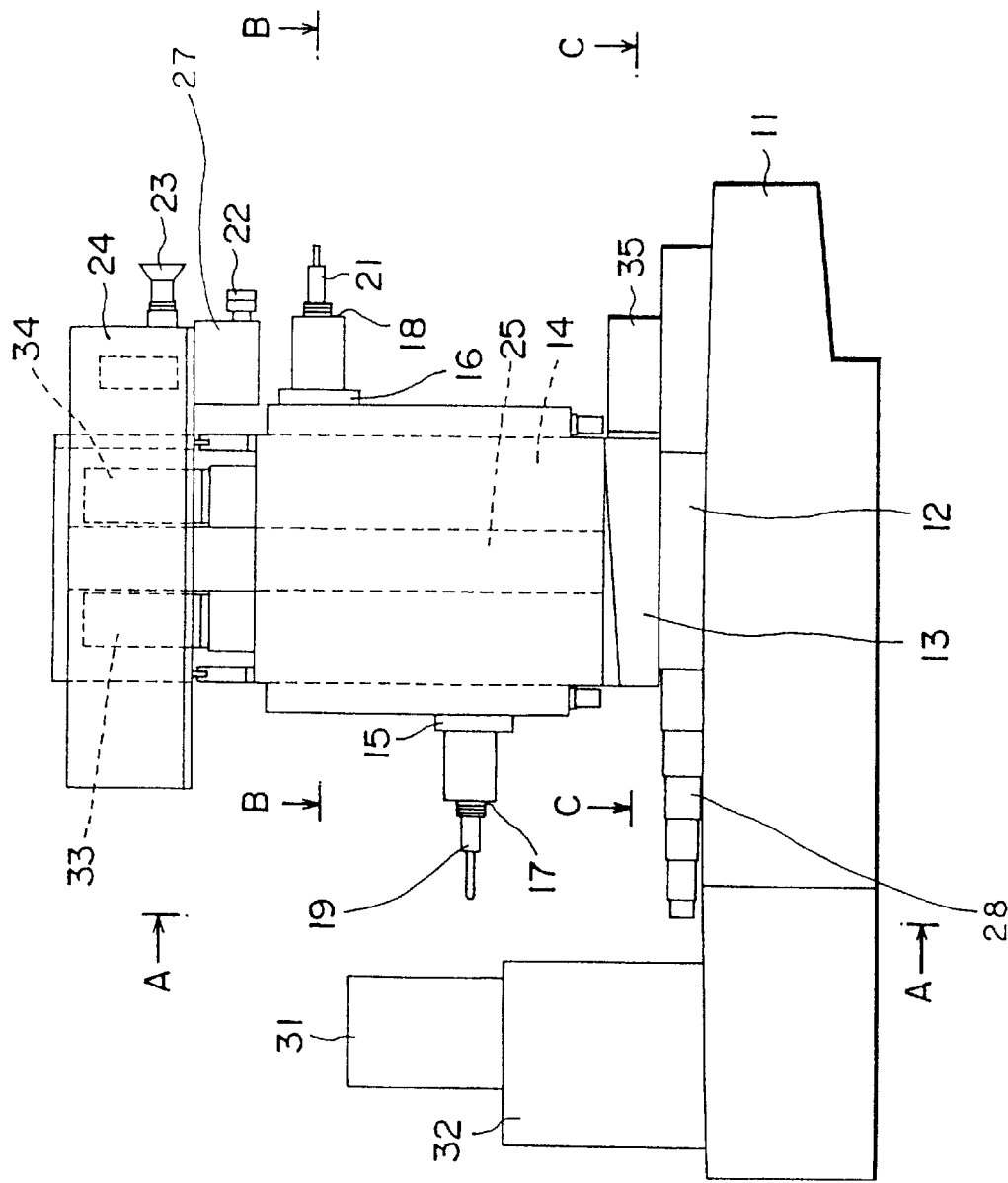
FIG. 1 is a side view of a machining device according to a first embodiment of the present invention.
Figure 2:
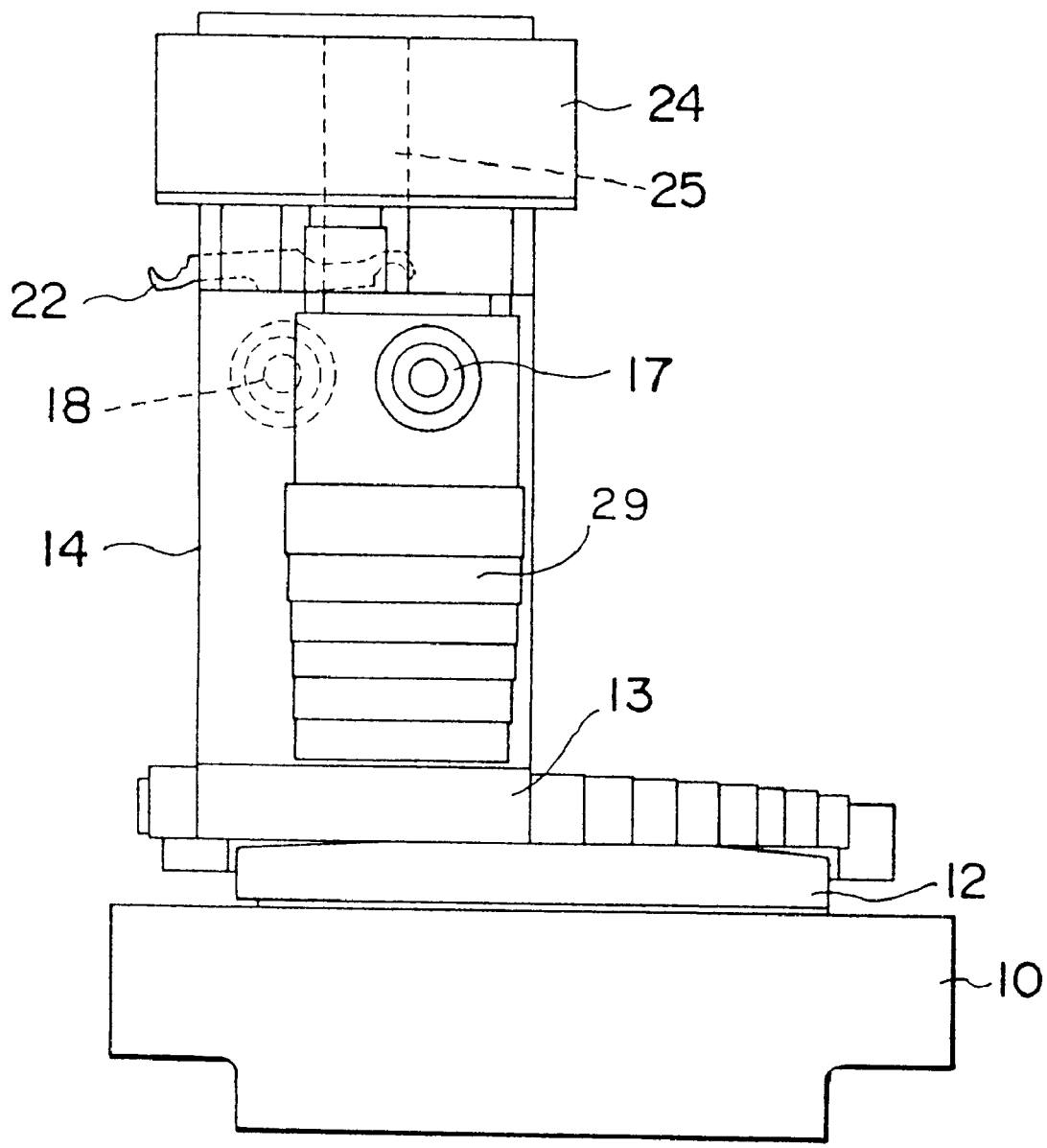
FIG. 2 is a front view of the machining device (a sectional view taken on line A—A in FIG. 1)
Figure 3:
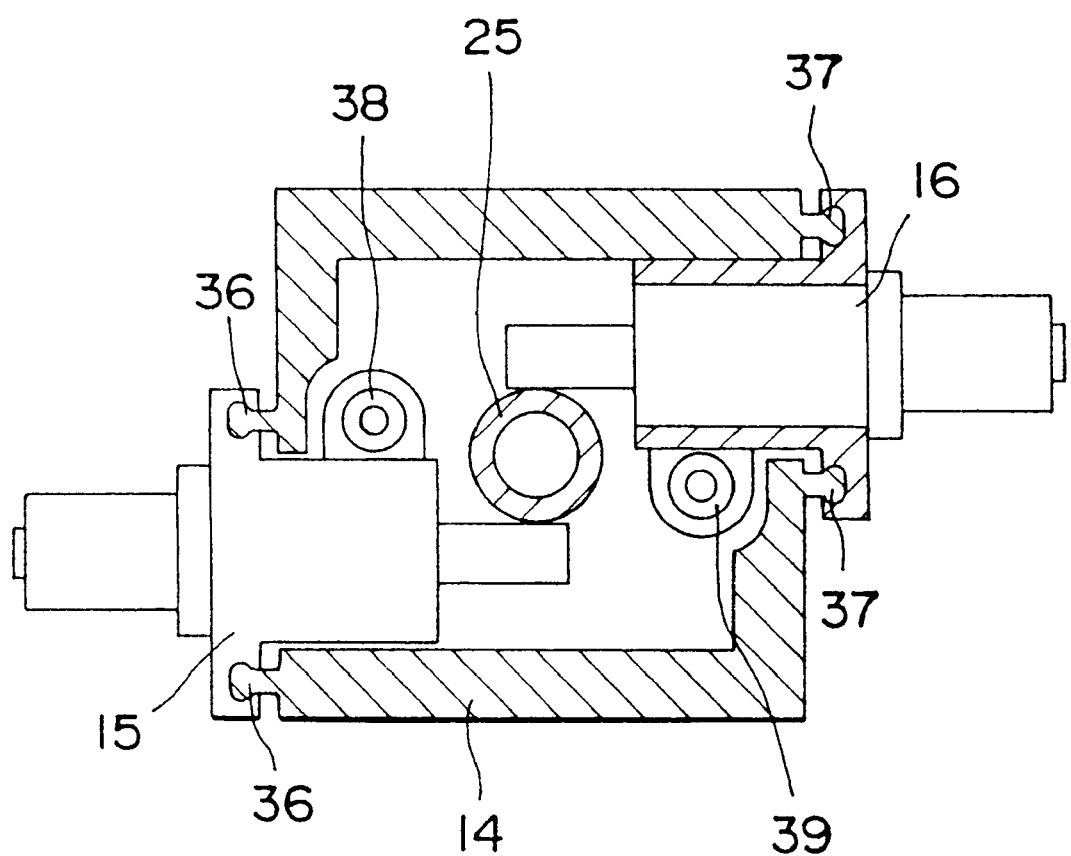
FIG. 3 is a horizontal sectional view of a column (a sectional view taken on line B—B in FIG. 1)
Figure 4:
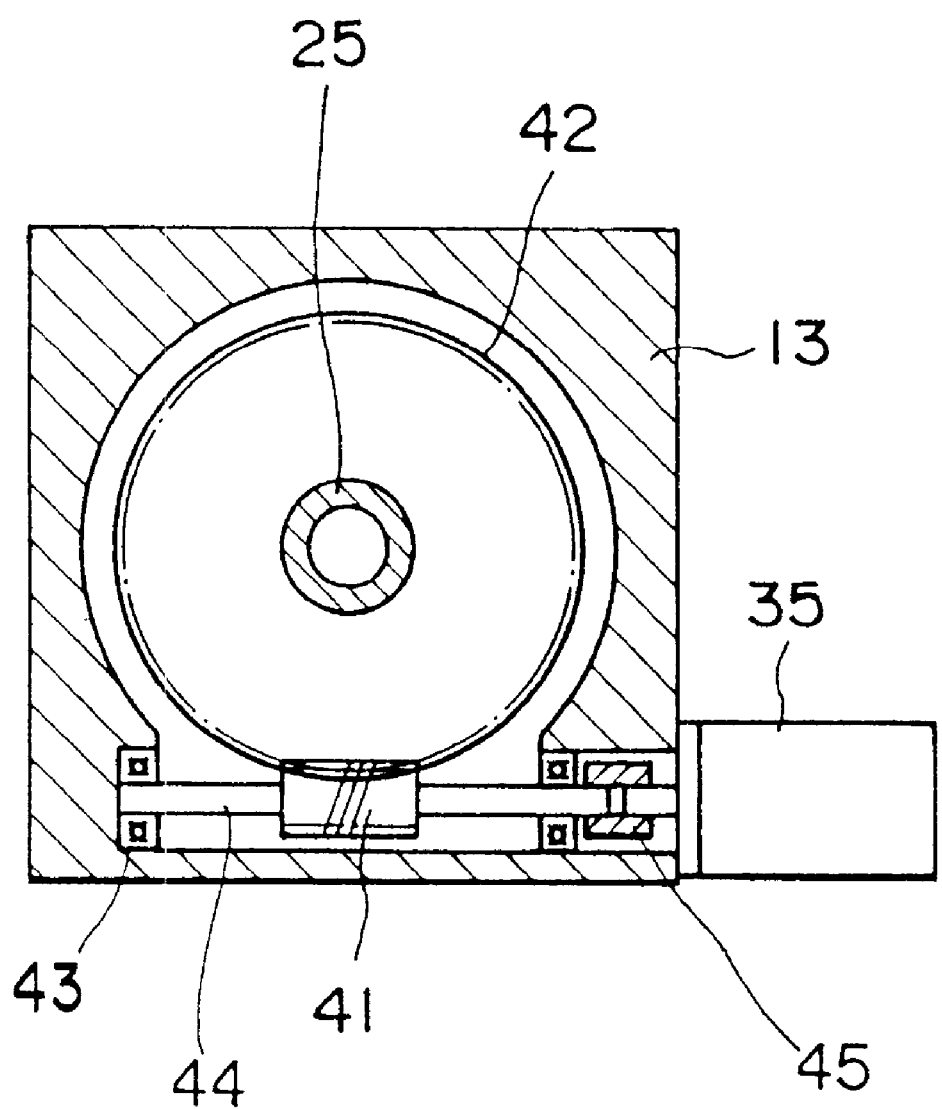
FIG. 4 is a sectional view of a lower portion of the column (a sectional view taken on line C—C in FIG. 1), showing a mechanism for turning the column.

FIG. 1 is a side view of a machining device (machining center type) according to the present embodiment. FIG. 2 is a front view of the machining device (a sectional view taken on line A—A in FIG. 1). FIG. 3 is a horizontal sectional view of a column (a sectional view taken on line B—B in FIG. 1). FIG. 4 is a sectional view of a lower portion of the column (a sectional view taken on line C—C in FIG. 1), showing a mechanism for turning the column.

As shown in FIG. 1, the machining device equipped with a spindle position interchanger according to the present embodiment comprises a longitudinal table 12 provided on a bed 11 and movable in a horizontal direction; a transverse table 13 provided on the longitudinal table 12 and movable in a direction perpendicular to the table 12; a column 14 erected on the transverse table 13 and turnable in a horizontal plane; a first spindle head 15 vertically movable along the column 14; a second spindle head 16 provided at a position different from the position of the first spindle head 15 (in the present embodiment, the second spindle head is 16 provided at a position at 180° to, i.e. opposite to, the position of the first spindle head 15) and vertically movable along the column 14 independently of the first spindle head 15; a first main spindle 17 and a second main spindle 18 attached to the first spindle head 15 and the second spindle head 16, respectively; a tool change arm 22 for changing a tool 21 in the second main spindle 18; and a tool magazine 24 mounted on an upper portion of the column 14 for housing many tools 23. The transverse table 13 may be placed below, and the longitudinal table 12 may be placed above the transverse table 13. The first main spindle 17 and the second main spindle 18 are axisymmetrical so that they will come to the same positions after the column 14 turns about a strut 25. In FIG. 1, the reference numeral 31 denotes a workpiece, 32 denotes a table bearing the workpiece, 33 denotes a feed motor for the first spindle head 15, 34 denotes a feed motor for the second spindle head 16, and 35 denotes a positioning motor as a turning means. In FIGS. 1 and 2, the reference numeral 27 denotes an automatic tool changer (ATC), 28 denotes a Z-axis (longitudinal axis) slide cover, and 29 denotes a Y-axis (vertical axis) lower slide cover.

As shown in FIG. 3, the first spindle head 15 is vertically movable by the feed motor 33 while being guided by a guide 36 provided on the column 14. Likewise, the second spindle head 16 is vertically movable by the feed motor 34 while being guided by a guide 37 provided on the column 14. Moreover, the first spindle head 15 can be delivered by a feed screw 38 joined to the feed motor 33. Similarly, the second spindle head 16 can be delivered by a feed screw 39 joined to the feed motor 34.

The strut 25 shown in FIGS. 3 and 4 is fixed to the transverse table 13, and the tool magazine 24 is suspended from and supported by an upper portion of the strut 25. About this strut 25, the first spindle head 15 and the second spindle head 16 turn along with the column 14, with the result that the position of the first main spindle 17 and the position of the second main spindle 18 interchange.

According to the present embodiment, the tool change arm 22 is provided only on the side of the second main spindle 18. Thus, change for the tool 23 in the tool magazine 24 provided on the upper portion of the strut 25 that does not turn is performed at the same position on a non-machining side. In FIG. 4, the reference numeral 43 denotes a bearing, 44 denotes a shaft, and 45 denotes a coupling.

In FIG. 1, assume that the site of the first main spindle 17 is a machining position, and the site of the second main spindle 18 is a tool change position. In this case, while the tool 19 in the first main spindle 17 is machining the workpiece 31, a tool change operation is performed in which the tool 21 in the second main spindle 18, and the tool 23 selected from a plurality of tools in the tool magazine 24 are simultaneously gripped and interchanged by the tool change arm 22. After tool change, the second main spindle 18 is started and rotated until a predetermined revolution speed is reached. Upon completion of the machining with the tool 19 in the first main spindle 17, the column 14 is turned 180° to interchange the positions of the first main spindle 17 and the second main spindle 18.

In FIG. 4, the positioning motor 35 attached to the transverse table 13 rotates a worm gear 41, and a worm wheel 42 engaged with the worm gear 41. Since the worm wheel 42 is joined to the column 14, a predetermined angle of rotation given to the positioning motor 35 enables the column 14 to turn 180°.

In the present machining device, tool change is performed on the second main spindle 18 side. A tool change operation is the same as that described in the "Description of the Related Art" section. However, this change operation is performed in parallel with the machining operation on the first main spindle 17 side. Hence, the time required for tool change falls within the machining time taken on the first main spindle 17 side. The tool 23 to be used next is mounted on the second main spindle 18, which is actuated until it reaches a predetermined revolution speed. By so doing, the tool change time (non-machining time) taken by the machining device is reduced to merely the 180° turning time for interchanging the positions of the first main spindle 17 and the second main spindle 18.

Figure 7A:
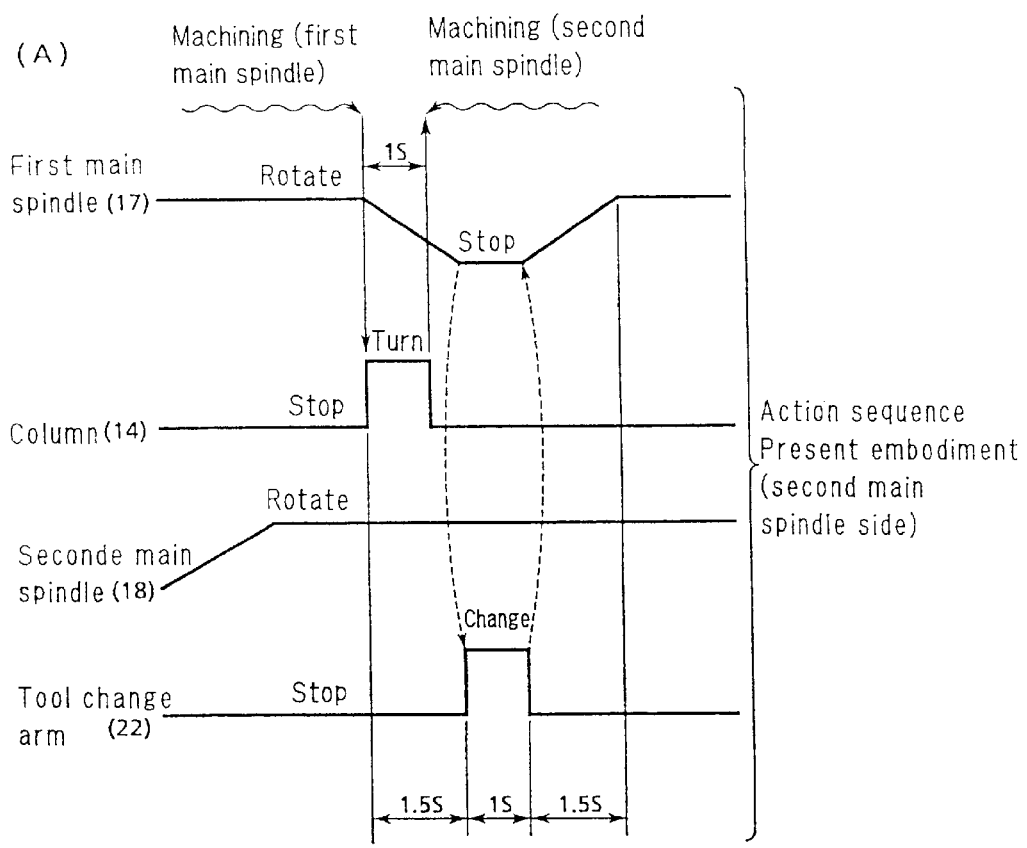
Figure 7B:
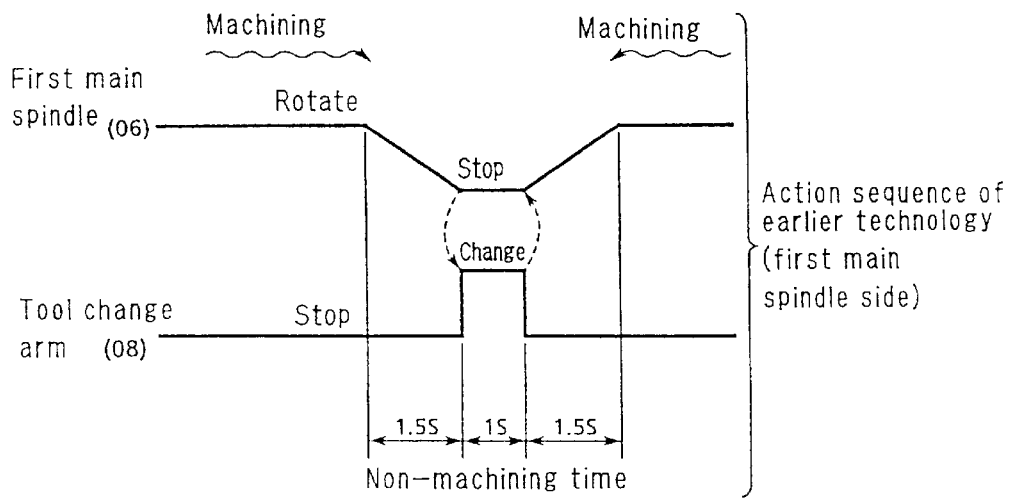
FIG. 7(B) is a view showing a sequence of actions of a conventional device (a two-spindle device)
Figure 8:
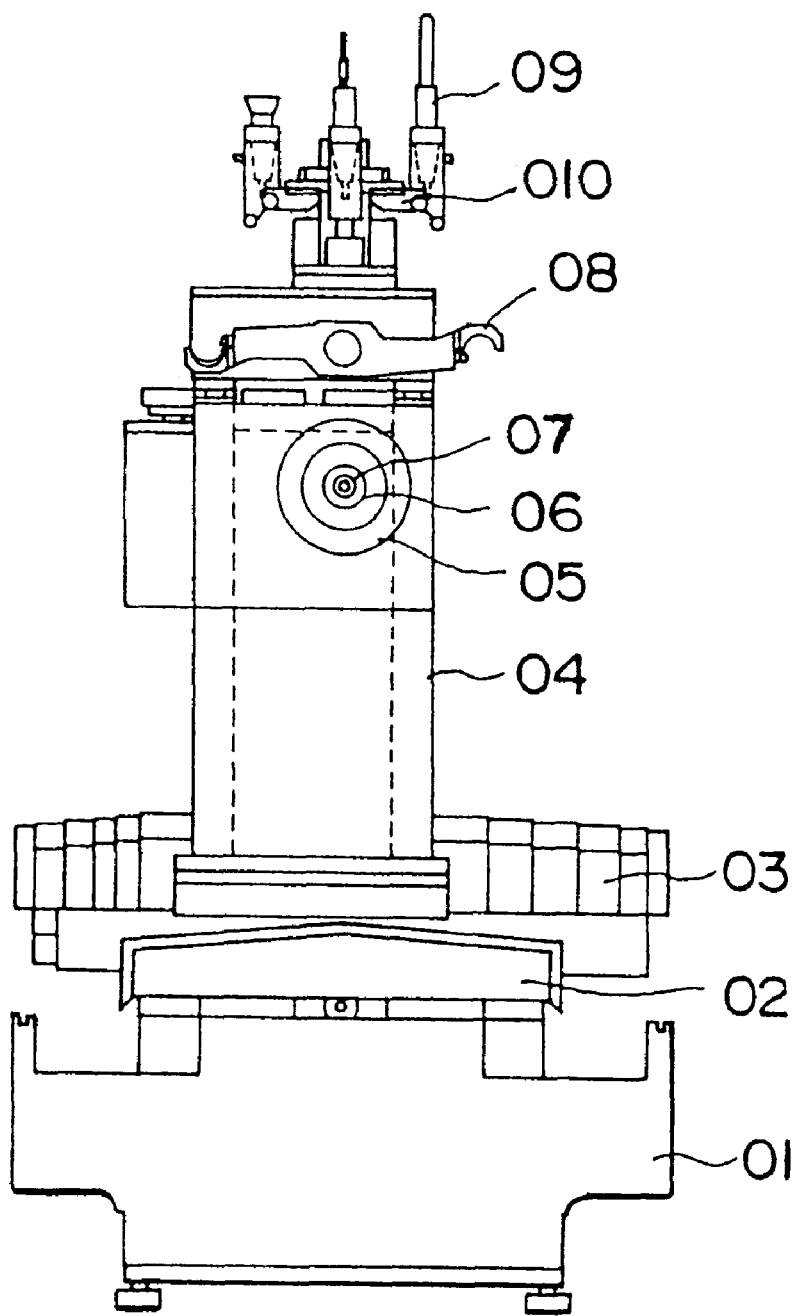
FIG. 8 is a front view of a machining device according to an earlier technology.
Figure 9:
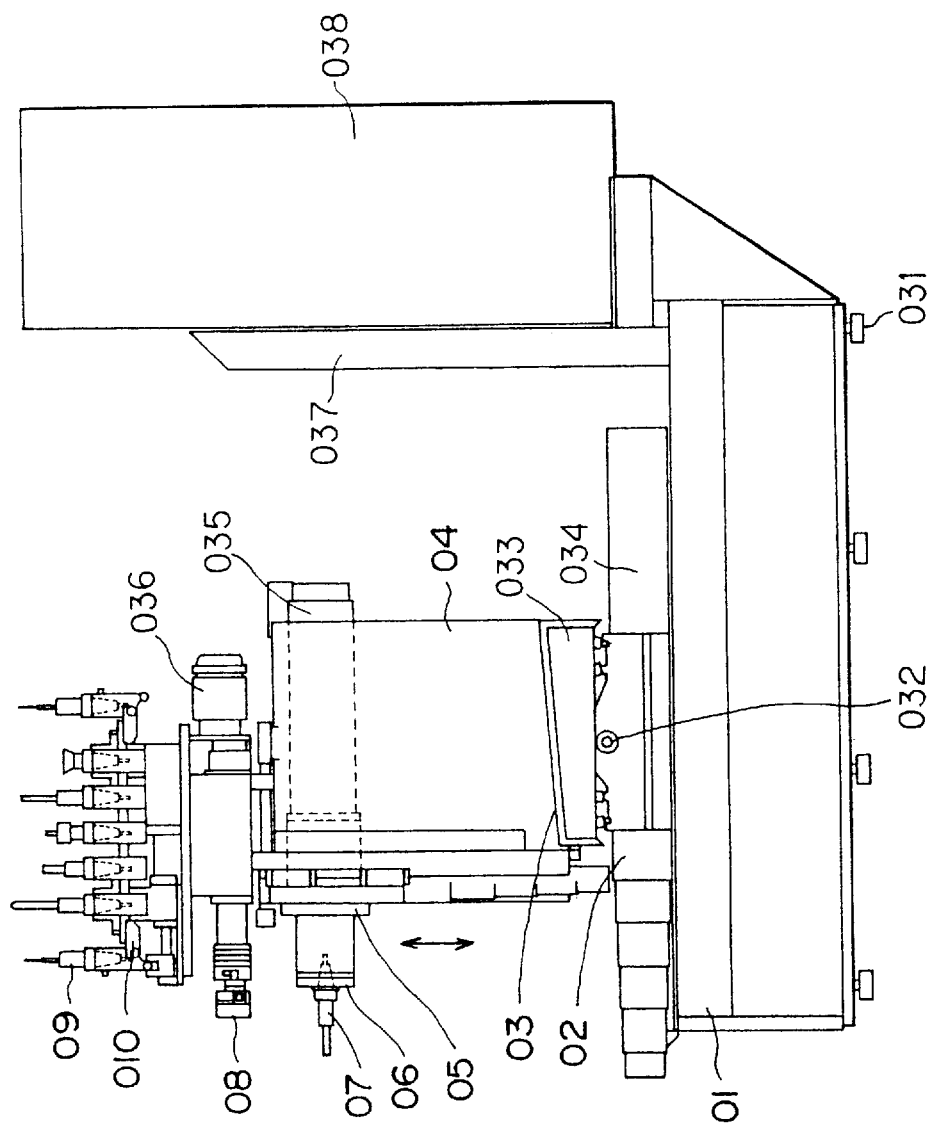
FIG. 9 is a side view of the machining device.
Figure 10:
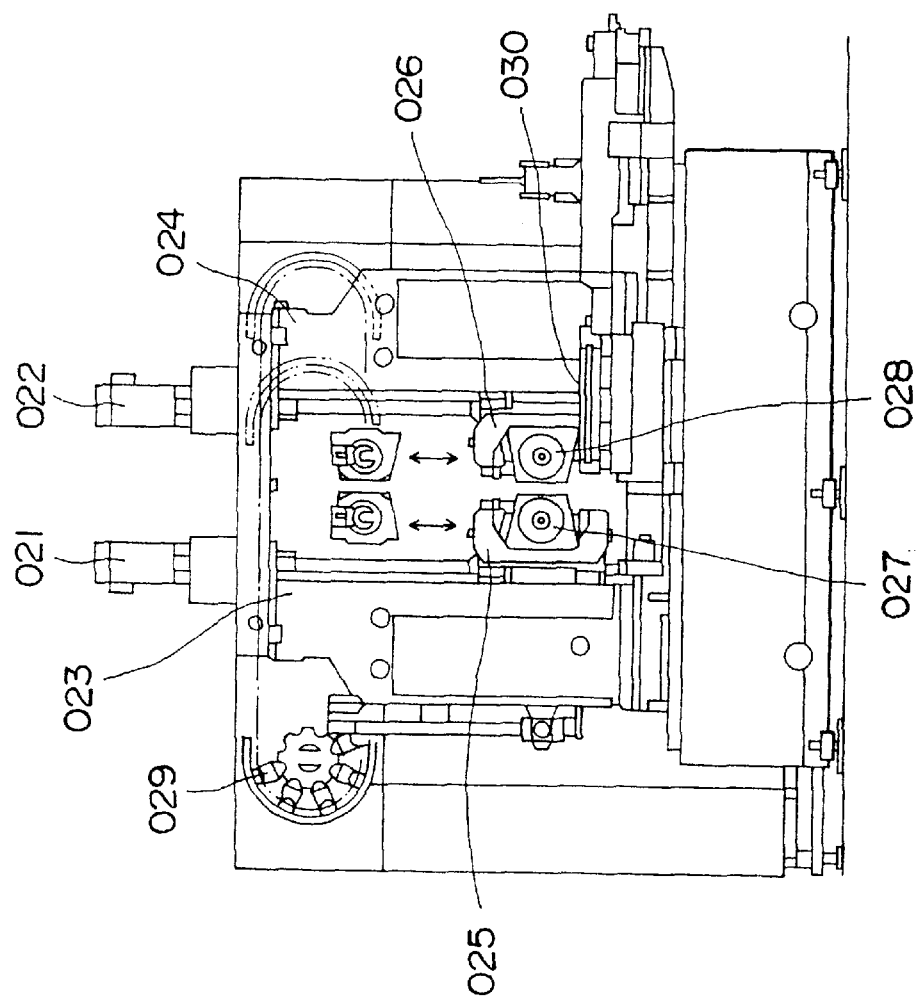
FIG. 10 is a side view of a machining device having two spindles according to an earlier technology.

This is demonstrated in FIG. 7. FIG. 7(A) shows a sequence of actions of the present embodiment (a two-spindle apparatus), while FIG. 7(B) shows a sequence of actions of a conventional apparatus (a one-spindle apparatus).

As shown in FIG. 7(B), an example of the conventional method takes 1.5 seconds to stop the main spindle 06, 1 second to change the tool by use of the tool change arm 08, and 1.5 seconds to start the main spindle 06, namely, a non-machining time (called a chip-to-chip tool change time) of total 4 seconds. With the conventional method, therefore, a marked reduction in the non-machining time is difficult.

On the other hand, according to the present embodiment as shown in FIG. 7(A), if the machining time on the first main spindle 17 side is 4 seconds or more, the chip-to-chip tool change time will become apparently zero, and the 180° turning time for the first main spindle 17 and the second main spindle 18 will be the only non-machining time. Speeding this 180° turn to end within 1 second will remarkably shorten the non-machining time. This effect will increase as the frequency of tool change increases. Furthermore, tool change is performed always on the side opposite to the machining side. Thus, there is no interference between the workpiece 31 and actions associated with tool change, and the timing of change may be arbitrary. Besides, when the first main spindle 17 and the second main spindle 18 are interchanged upon 180° turning, the same machining position is retained even after turning, because these main spindles are axisymmetric. Consequently, the effective moving distance to and from the workpiece is not decreased.

According to the present embodiment, the first main spindle and the second main spindle have been provided at positions 180° to each other. However, the present invention is not restricted to these positions, but may have these main spindles at arbitrary positions, for examples, 90° or 270° to each other. Nor is the number of the main spindles restricted to two, but two or more main spindles may be provided.

Second Embodiment

Figure 5:
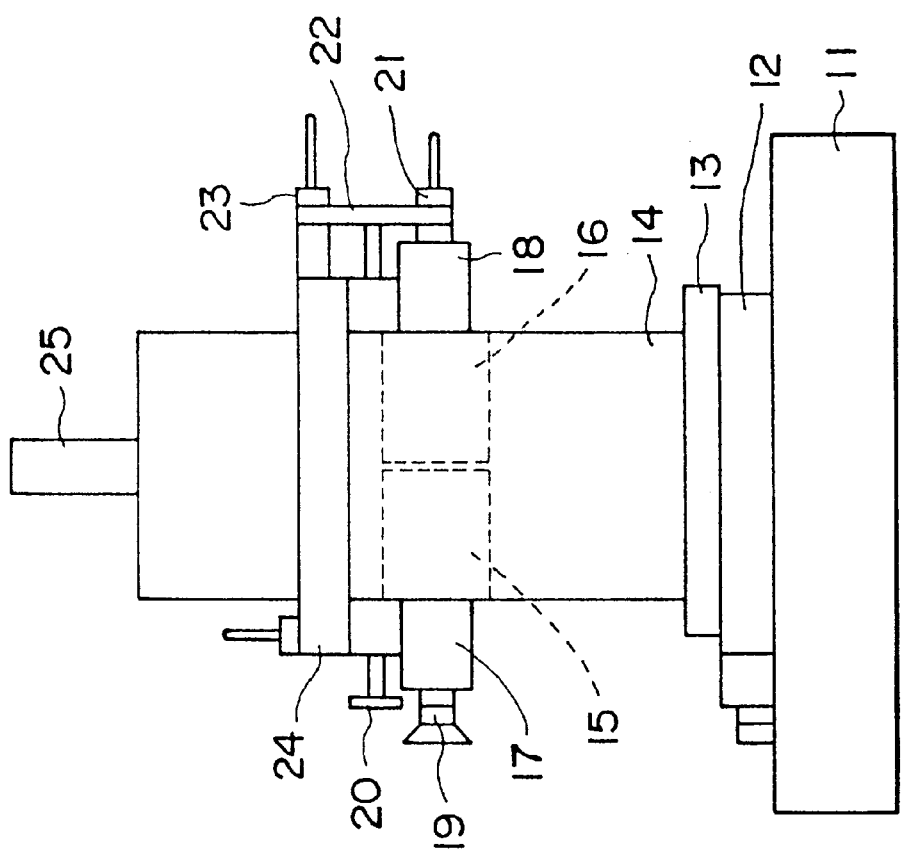
FIG. 5 is a perspective view of a machining device according to a second embodiment of the present invention.

FIG. 5 is a concept drawing of a machining device equipped with a spindle position interchanger according to a second embodiment of the present invention. This embodiment is different from the first embodiment in the position of mounting of a tool magazine and in the provision of two kinds of tool change arms.

As shown in FIG. 5, the machining device equipped with a spindle position interchanger according to the present embodiment comprises a longitudinal table 12 provided on a bed 11 and movable in a horizontal direction; a transverse table 13 provided on the longitudinal table 12 and movable in a direction perpendicular to the table 12; a column 14 erected on the transverse table 13 and turnable in a horizontal plane; a first spindle head 15 vertically movable along the column 14; a second spindle head 16 provided at a position different from the position of the first spindle head 15 (in the present embodiment, the second spindle head 16 is provided at a position at 180° to, i.e., opposite to, the position of the first spindle head 15) and vertically movable along the column 14 independently of the first spindle head 15; a first main spindle 17 and a second main spindle 18 attached to the first spindle head 15 and the second spindle head 16, respectively; a tool change arm 20 for changing a tool 19 in the first main spindle 17; a tool change arm 22 for changing a tool 21 in the second main spindle 18; and a tool magazine 24 mounted on an upper portion of the column 14 for housing many tools 23. The transverse table 13 may be placed below, and the longitudinal table 12 may be placed above the transverse table 13. The tool magazine 14 is provided integrally with the column 14, and turns according to the turning of the column 14. In the present embodiment, therefore, the tool change arm is provided on each of the first main spindle 17 side and the second main spindle 18 side.

As noted above, the machining device has the tool change arm 20 for changing the tool in the first main spindle 17, and the tool change arm 22 for changing the tool in the second main spindle 18. Thus, if there is a wait time until a next machining operation upon completion of machining of the workpiece, for example, the tool change arm 20 on the first main spindle 17 side may be used to change the tool for a tool to be used in the next machining. This will make tool change possible on the spot without turning the column 14.

Third Embodiment

FIG. 6 is a concept drawing of a machining device equipped with a spindle position interchanger according to a third embodiment of the present invention. This machining device is designed to interchange the positions of main spindles by rotating the main spindles about a horizontal turning axis.

As shown in FIG. 6, the machining device equipped with a spindle position interchanger according to the present embodiment comprises a longitudinal table 12 provided on a bed 11 and movable in a horizontal direction; a transverse table 13 provided on the longitudinal table 12 and movable in a direction perpendicular to the table 12; a column 14 erected on the transverse table 13; a first spindle head 15 vertically movable along the column 14; a second spindle head 16 provided at a position different from the position of the first spindle head 15 (in the present embodiment, the second spindle head 16 is provided at a position at 180° to, i.e., opposite to, the position of the first spindle head 15); a first main spindle 17 and a second main spindle 18 attached to the first spindle head 15 and the second spindle head 16, respectively; a tool change arm 22 for changing a tool 21 in the second main spindle 18; and a tool magazine 24 for housing many tools 23.

The first spindle head 15 and the second spindle head 16 are integrated with and inseparable from each other, and are supported by the column 14 turnably about a turning axis 26. The resulting head formed by integration (hereinafter referred to as "the integrated head") is turned by a turning means (not shown) about the turning axis 26 which is horizontal. The first main spindle 17 and the second main spindle 18 are disposed axisymmetrically so that after turning, the integrated head will come to the same machining position.

The tool magazine 24 is retreated to a position above the column 14 at the time of turning the integrated head to avoid its contact with the tools provided in the main spindle 17 and the main spindle 18. When the turning radius is to be made small, the tips of the spindle heads 15 and 16 may be retracted before turning by moving the first main spindle 17 and the second main spindle 18 backward into the first spindle head 15 and the second spindle head 16, respectively, whereafter the integrated head may be turned. Furthermore, the turning axis 26 of the integrated head may be lowered toward the bed 11 to decrease the amount of upward retreat of the tool magazine 24. In this manner, the position of the integrated head can be adjusted so that the workpiece can be machined satisfactorily even if the machining position of the workpiece is high, for example.

As noted above, while the workpiece (not shown) is being machined on the first main spindle 17 side, the tool 21 on the other main spindle, the second main spindle 18, is changed for a next tool 23 in the tool magazine 24 by means of the tool change arm 22. The tool 23 after change is rotated until it reaches a predetermined revolution speed. Then, when machining with the tool 19 in the first main spindle 17 is completed, the integrated head is immediately turned so that subsequent machining can be performed at once with the use of the tool 23 in the second main spindle 18 that is rotating. This makes unnecessary the time for the conventional tool change operation that is performed with the rotation of the main spindle being stopped. Moreover, after interchanging of both main spindles, the tool in the second main spindle has reached a predetermined revolution speed. Hence, machining can be started without delay, resulting in a marked reduction in the non-machining time.

Fourth Embodiment

Figure 11:
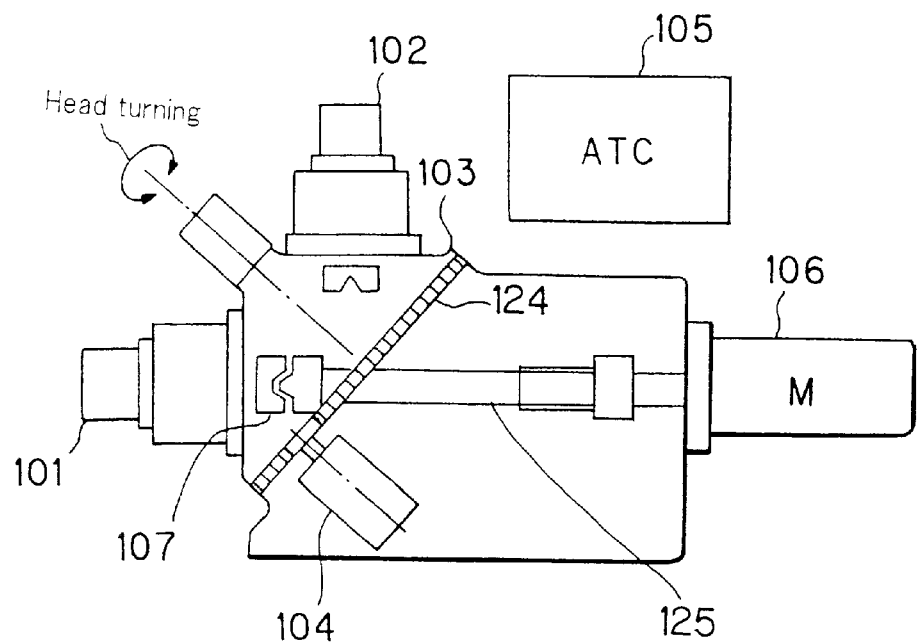
FIG. 11 is an explanation drawing of a machining device according to a fourth embodiment of the present invention.

A machining device equipped with a spindle position interchanger according to a fourth embodiment of the present invention is designed to interchange the positions of two main spindles by rotating the two main spindles about an inclined axis of turning. That is, as shown in FIG. 11, the present invention is applied to a machining device having a turret unit 103 which uses appropriate main spindles 101, 102 indexed at machining positions, the main spindles 101, 102 being selected from among a plurality of main spindles 101, 102 depending on the type of work to be machined, or the type of machining.

In this machining device, the turret unit 103 is provided turnably about an obliquely inclined axis of turning, and two main spindles 101 and 102 perpendicular to each other are provided on the turret unit 103. Further, a head turning motor 104 is provided for rotating the turret unit 103 about the turning axis, and an index device is provided for positioning the main spindles 101, 102 at arbitrary angles through which the main spindles 101, 102 are turned by turning the turret unit 103. In FIG. 11, the reference numeral 124 denotes a gear, and 125 denotes a clutch shaft. An automatic tool changer (ATC) 105 is also provided for changing the tool on the main spindle 102 located at a non-machining position.

Behind the plurality of main spindles 101, 102, a spindle drive motor 106 is placed, and connected via a clutch 107 to the main spindle 101 located at a machining position.

With the present machining device, the two main spindles 101 and 102 are arranged at right angles to each other. Thus, when the two main spindles 101 and 102 are turned 180° about the turning axis, the positions of the two main spindles 101 and 102 are interchanged. The two main spindles 101 and 102 do not necessarily need to be arranged at right angles to each other. However, it is necessary that the two main spindles 101 and 102 be in the same plane, and the turning axis be provided at an angular position at which the turning axis divides the angle between the two main spindles 101 and 102 into two halves.

According to the above-described machining device, while work is being machined with a tool in the main spindle 101 located at the machining position, a tool is changed by the ATC 105 for the main spindle 102 located at the non-machining position, so that preparations can be made for subsequent machining. Then, the turret 103 is turned about the turning axis to move the main spindle 102 to the machining position, whereupon machining of work can be resumed immediately.

Figure 12:
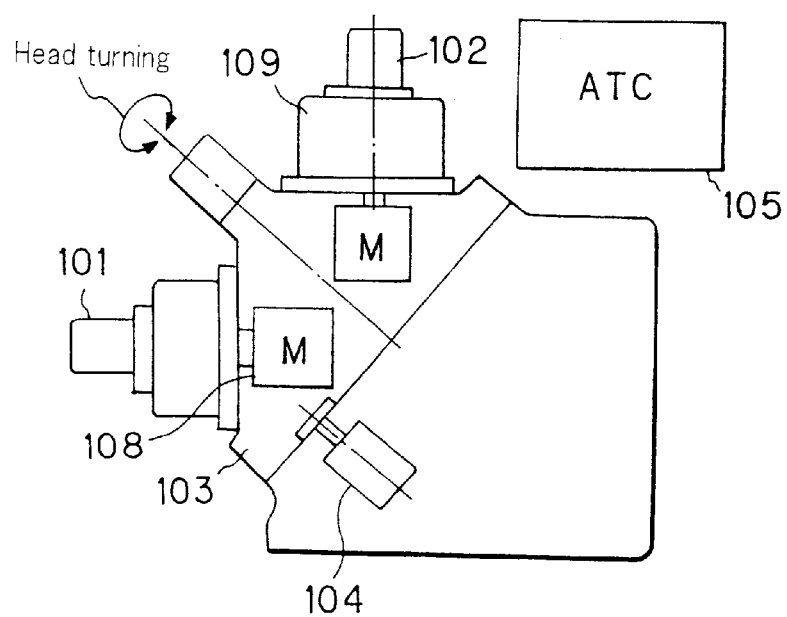
FIG. 12 is an explanation drawing of the machining device according to the fourth embodiment (a spindle direct drive motor type)

However, if the position of the main spindle 101 being machined is changed for the position of the other main spindle 102 for the purpose of machining, it is necessary to carryout a series of actions, i.e., stopping the rotation of the spindle drive motor 106 driving the main spindle 101 being machined; disengaging the clutch 107; turning the turret unit 103 to position the other main spindle 102 at the machining position with the use of the index device; engaging the clutch 107; and rotating the spindle drive motor 106. Hence, the time for stopping the rotation of the main spindle, the clutch disengaging time, the indexing time, the clutch engaging time, and the time for starting up rotation of the main spindle occur as a lost time (non-cutting time), in addition to the actual machining time (actual cutting time). To minimize such a lost time, a machining device having drive motors directly connected to the respective main spindles can be provided as shown in FIG. 12. That is, as illustrated in FIG. 12, the machining device has a turret unit 103 provided with drive motors 108, 109 for individually driving a plurality of main spindles 101, 102, namely, a structure in which the main spindles 101, 102 are directly connected to the drive motors 108, 109. It is also permissible to employ not only direct connection to the drive motor, but also other types of power transmission, such as driving via a belt, or driving via gears.

According to the present embodiment, moreover, ATC (automatic tool changer) 105 is installed for the main spindle 102 located at a non-machining position, so that while the other main spindle 101 at a machining position is machining, a tool to be used next can be fed from the magazine of the ATC and mounted on the main spindle 102 located at the non-machining position.

As described above, the machining device shown in FIG. 12 has the drive motors 108, 109 for individually driving the plurality of main spindles 101, 102, the main spindles 101, 102 being directly connected to the drive motors 108, 109. Thus, the clutch 107 shown in FIG. 11 can be omitted, and tool change and start of rotation for the main spindle 102 are possible even during indexing for interchange with the main spindle 101. Thus, during machining using a certain main spindle 101, a tool in another main spindle 102 can be rotated beforehand, and can be put into machining after indexing of the main spindle 101.

Hence, the time for stopping rotation of the main spindle 101 now in a machining operation, the clutch disengaging time/engaging time, and the start-up time for rotation of the main spindle to be used next can be made to overlap. Apparently, the lost time is only the indexing time for the main spindle, so that the non-cutting time can be decreased markedly.

Fifth Embodiment

A machining device equipped with a spindle position interchanger according to a fifth embodiment of the present invention has two main spindles arranged perpendicularly to or parallel to a turning axis.

Figure 13:
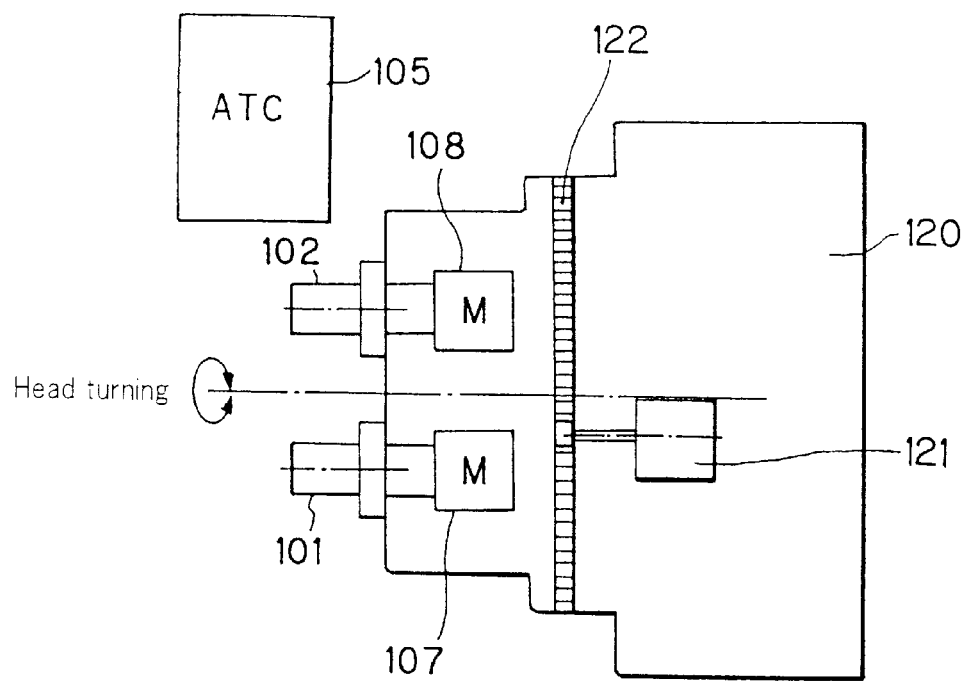
FIG. 13 is an explanation drawing of a machining device according to a fifth embodiment of the present invention (a turning axis and main spindles are parallel)

As shown in FIG. 13, two main spindles 101 and 102 may be placed parallel to a turning axis. Alternatively, as shown in FIG. 14, the two main spindles 101 and 102 may be placed at phases turned 180° on a plane including the turning axis.

Figure 14:
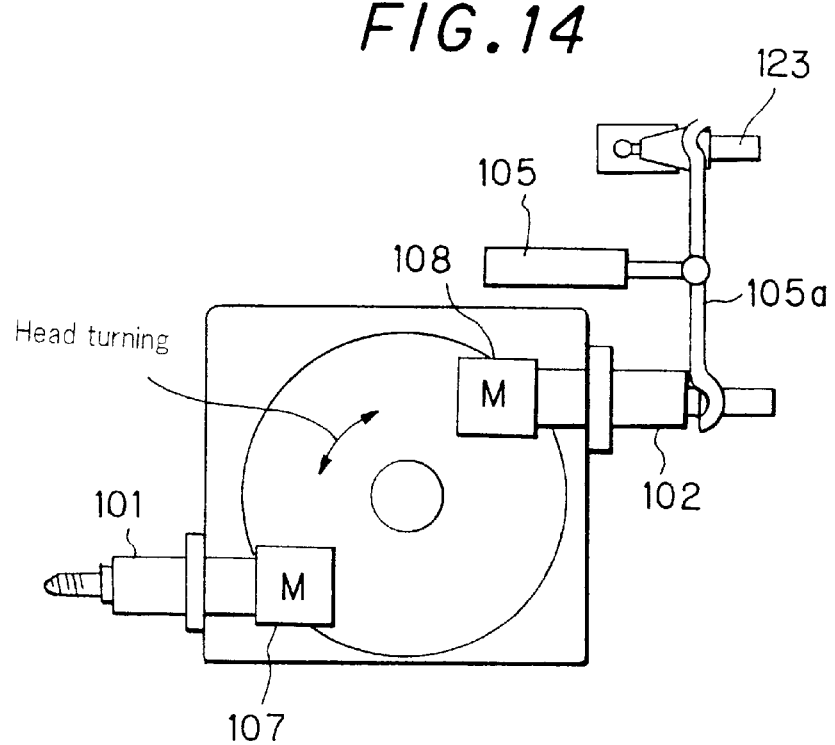
FIG. 14 is an explanation drawing of the machining device according to the fifth embodiment (a turning axis and main spindles are perpendicular)

In the case of FIG. 14, the turning axis intersects the plane, including the two main spindles, at right angles. In the machining device shown in FIG. 13, too, drive motors 107, 108 are directly connected to the respective main spindles 101 and 102, and an automatic tool changer (ATC) 105 for changing tools is provided for the main spindle 102 located at a non-machining position. These drawings show the interior of the single spindle head, the embodiment illustrated in FIG. 6. In FIGS. 13 and 14, the reference numeral 120 denotes a bed body, 121 denotes a motor, 122 denotes a gear, and 123 denotes a tool.

In the machining device shown in FIG. 14, too, drive motors 107, 108 are directly connected to the respective main spindles 101 and 102, and an automatic tool changer (ATC) 105 having a tool change arm 105a for changing tools is provided for the main spindle 102 located at a non-machining position.

In these machining devices as well, therefore, during machining using the main spindle 101 located at the machining position, tool change can be performed by the ATC 105 for the main spindle 102 located at the non-machining position. In interchanging the positions of the main spindles 101 and 102 by turning about the turning axis, the main spindles 101 and 102 can be driven by the drive motors 107 and 108, respectively. Like the preceding embodiment, the lost time can be minimized.

Sixth Embodiment

A machining device equipped with a spindle position interchanger according to a sixth embodiment of the present invention has two main spindles arranged at positions twisted relative to a turning axis. In comparison with the embodiment of FIG. 12 in which the two main spindles 101 and 102 lie on the same plane, the twisted position refers to a position such that the two main spindles 101 and 102 are offset by the same distance to become perpendicular to the original plane, including these main spindles, and point in directions opposite to each other.

Figure 15:
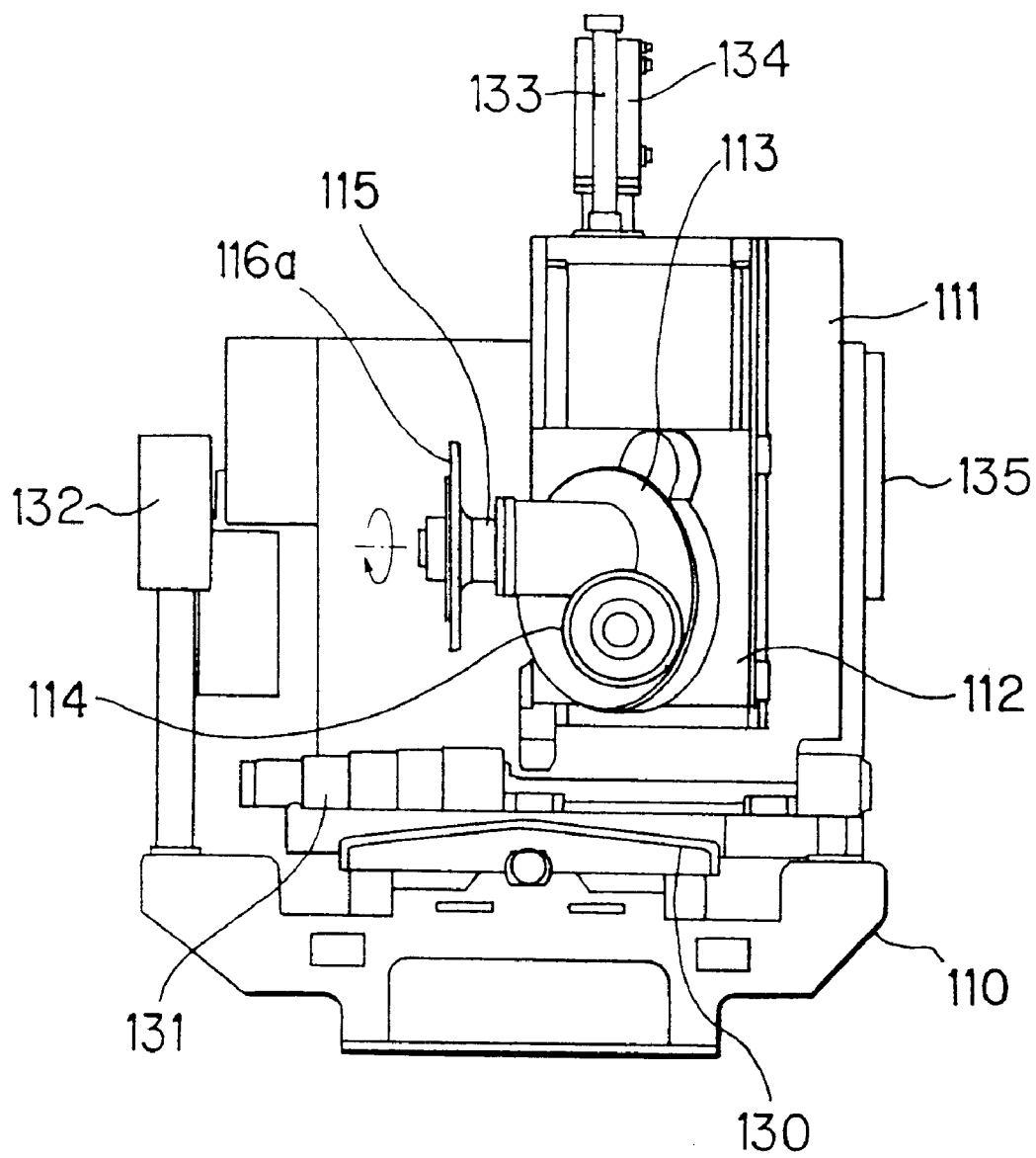
FIG. 15 is a side view of a machining device according to a sixth embodiment of the present invention (a turning axis and main spindles are at positions twisted relative to each other)
Figure 16:
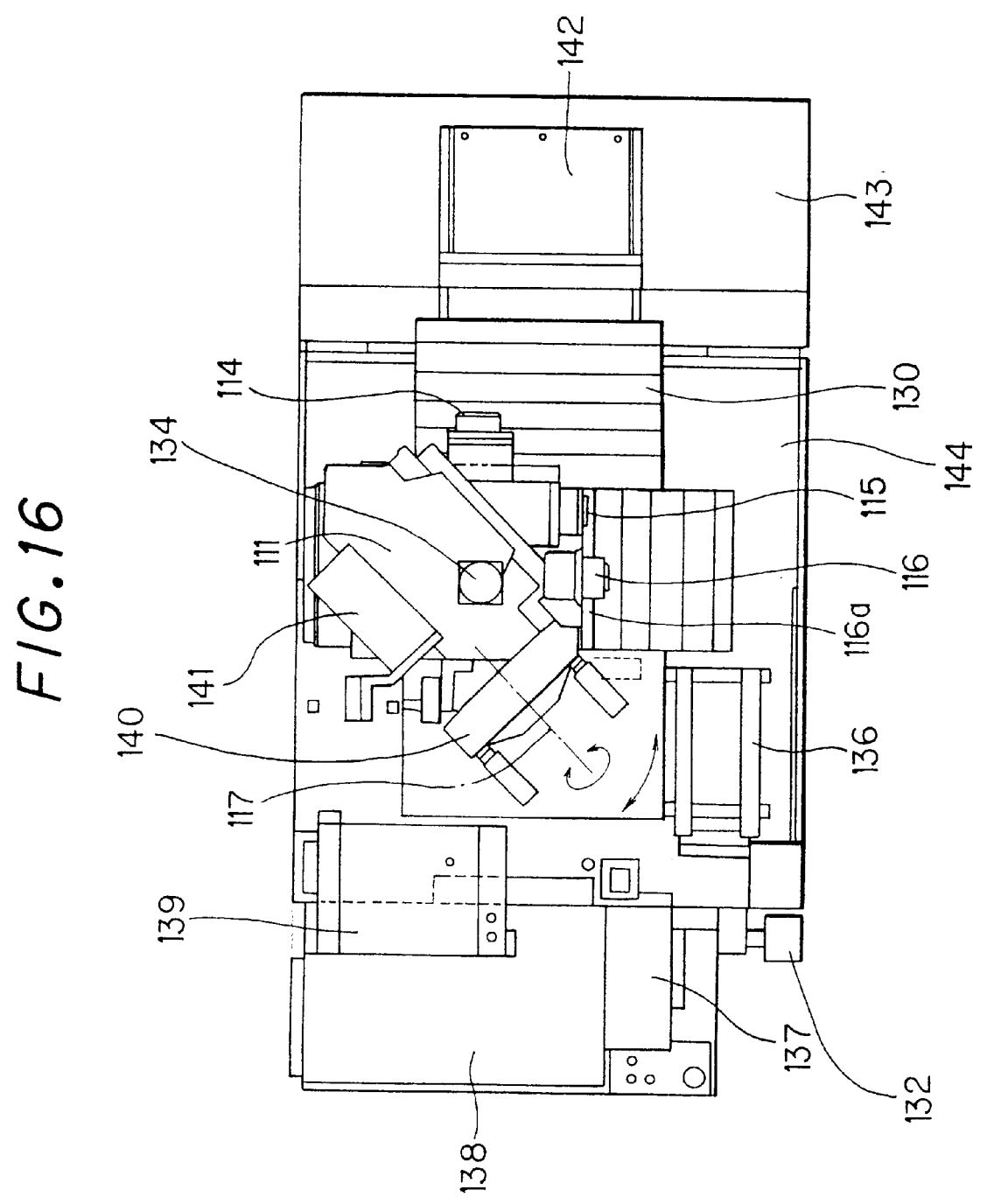
Figure 17:
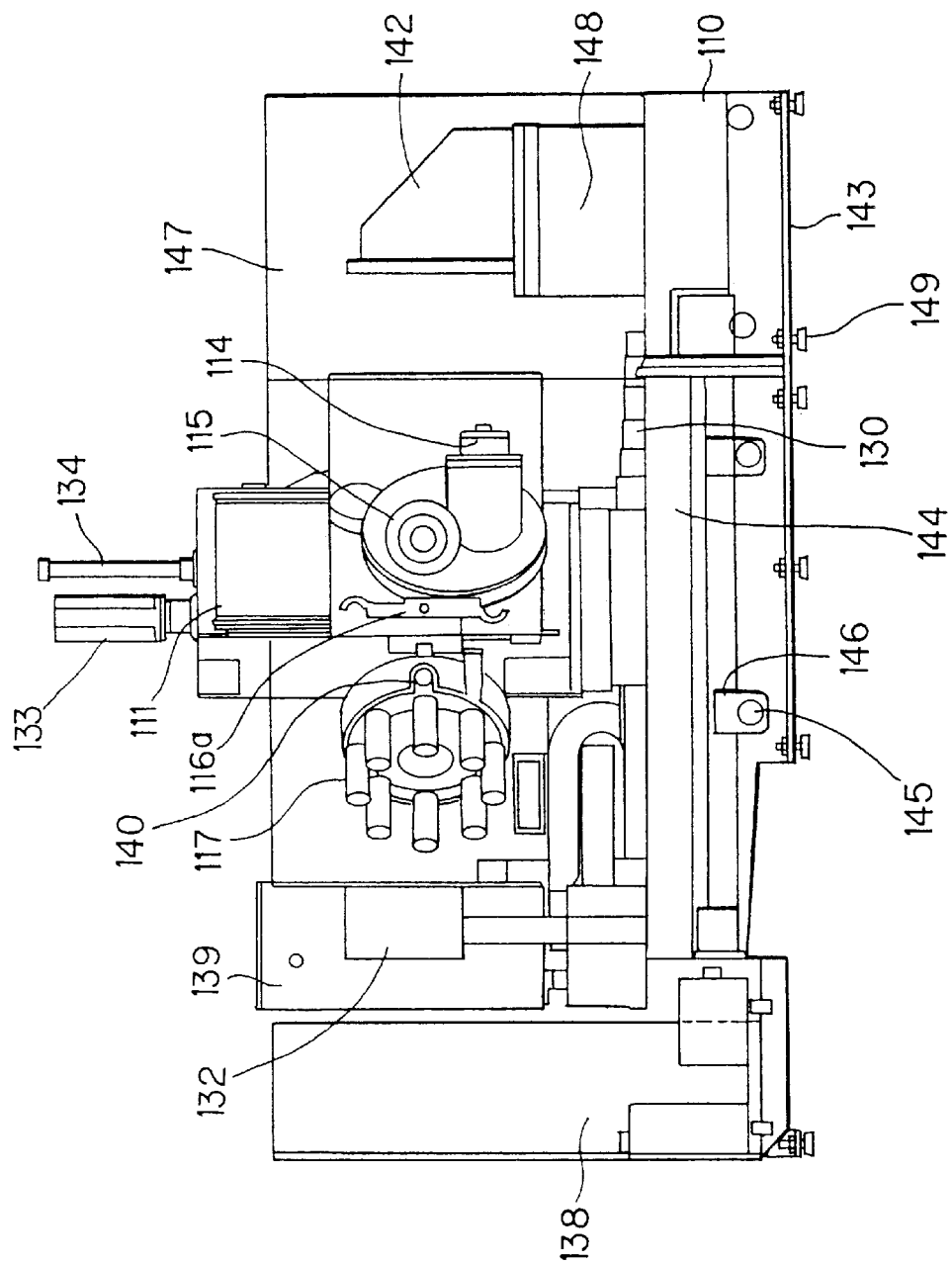
FIG. 17 is a front view of the machining device according to the sixth embodiment (a turning axis and main spindles are at positions twisted relative to each other)

That is, as shown in FIGS. 15 to 17, a spindle head 112 is vertically movably mounted on a moving column 111 horizontally moving in longitudinal and transverse directions, a turret unit 113 is provided on the spindle head 112 rotatably about a turning axis, a plurality of main spindles 114, 115 are provided on the turret unit. 113, positions of the main spindles 114 and 115 being interchangeable by rotation about the turning axis, and spindle drive motors (not shown) are directly connected to the respective main spindles 114 and 115. In FIGS. 15 to 17, the reference numeral 130 denotes a Z-axis front slide cover, 131 denotes an X-axis slide cover, 132 denotes an ATC subsidiary operating panel, 133 denotes a Y-axis balanced cylinder, 134 denotes a Y-axis servo motor, 135 denotes a CRT panel, 136 denotes a piping/wiring runner flex, 137 denotes a coolant tank, 138 denotes a control panel, 139 denotes a spindle cooling oilcon (oil chiller), 140 denotes an ATC magazine, 141 denotes ahead tail, 142 denotes a work mount, 143 denotes a jig-side bed, 144 denotes a device-side bed, 145 denotes a suspending hole, 146 denotes a rib, 147 denotes a device cover, and 148 denotes a jig pedestal.

Thus, when the two main spindles 114 and 115 are turned 180° about the turning axis, the positions of the two main spindles are interchanged to a machining position and a non-machining position. The machining device is also provided with an automatic tool changer 116 having a tool change arm 116a which performs tool change for the main spindle 115 located at the non-machining position, and is provided with an ATC magazine 117 which stores a plurality of tools. The moving column 111 need not move longitudinally or transversely, but instead, there may be a structure in which a work table bearing work is movable.

According to the present embodiment, the tool change arm and the ATC magazine can move following the spindle head (i.e., move together with the column in the X-axis and Z-axis directions, and vertically move in the Y-axis direction in succession to or in synchronism with the spindle head). Thus, tool change is possible between the second main spindle and the ATC magazine on any of the X, Y and Z axes.

The machining device may be such that movement can be made either on three axes, a longitudinal axis, a transverse axis and a vertical axis, or on only one of the three axes or a combination of two of the three axes. The tip of the main spindle may be any taper shank, such as MAS-BT30, BT40 or BT50 of the JIS standard, or a two-plane restraint tool holder typified by HSK of the DIN standard, or one complying with tool holder standards established by tool manufacturers themselves.

Besides, the automatic tool changer 116 is mounted for the main spindle 115 located at the non-machining position. Thus, during machining, a tool to be used subsequently is removed from the ATC magazine 117 and mounted on the main spindle 115 located at the non-machining position. This tool is rotated so as to be ready for subsequent machining. This measure makes automatic tool change a cycle executed parallel to machining. Thus, the automatic tool change time can be reduced to zero apparently.

In addition, the machining device may be one having a plurality of main spindles at each spindle position (a so-called multi-spindle head). Also, the machining device may be such that movement is possible on three axes, a longitudinal axis, a transverse axis and a vertical axis, or on only one of the three axes or a combination of two of the three axes.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A tool machine comprising:

two main spindles supported by a spindle position interchanger, the interchanger rotating about a turning axis:

a. a column for rotating in increments of 180 about said turning axis;

b. a first main spindle head provided at a first position and vertically movable along said column;

c. a second main spindle head provided at a second position opposite to said first position at 180° and vertically movable along said column; and d. driving motors for individually rotating each main spindle;

e. one of said first and second positions is positioned at a tool working position; another is positioned at an interchanging position for interchanging a tool mounted on the main spindle head;

f. a tool interchanging device for interchanging a tool mounted on one of said main spindle heads at said interchanging position; and g. control means for starting rotation of said main spindle head on which an interchanged tool is mounted prior to reaching said working position.

2. A tool machine with two main spindles rotating about respective main axes with a spindle position interchanger, the interchanger rotating a turning axis, said tool machine comprising:

a. a column and a main spindle head on which said main spindles are mounted to be movable in a vertical direction along said column, wherein each main spindle axis arranged perpendicular to said vertical direction and said two main spindles axes are arranged in transverse directions;

b. driving motors for individually rotating each main spindle;

c. wherein there are a first and second position, the first position is at a tool working position, and the second position is at an interchanging position for interchanging a tool mounted on the main spindle head;

d. a tool interchanging device for interchanging a tool mounted on one of said main spindle heads at said interchanging position; and e. control means for starting rotation of said main spindle head on which an interchanged tool is mounted prior to positioning thereof at said first position.

* * * * *